United States Patent [19]

Decker et al.

[11] Patent Number: 5,648,731

[45] Date of Patent: Jul. 15, 1997

[54] METHOD OF CHECKING SOLAR PANEL CHARACTERISTICS IN AN OPERATING SOLAR ELECTRICAL SYSTEM

[75] Inventors: Darwin Kent Decker, Hacienda Heights; Charles B. Loftis, Jr., Redondo Beach, both of Calif.

[73] Assignee: TRW Inc., Redondo Beach, Calif.

[21] Appl. No.: 596,842

[22] Filed: Feb. 5, 1996

Related U.S. Application Data

[62] Division of Ser. No. 60,103, May 11, 1993, Pat. No. 5,530,335.

[51] Int. Cl.$^6$ ................................................ G01R 31/26
[52] U.S. Cl. ................................................ 324/767
[58] Field of Search ........................ 324/158.1, 767, 324/73.1; 320/5, 39, 20, 23, 32; 363/95; 136/290

[56] References Cited

U.S. PATENT DOCUMENTS

4,205,265  5/1980  Staebler ........................ 324/767
4,656,419  4/1987  Garlick ........................ 325/767
4,794,272  12/1988  Bavard et al. ................ 320/15

*Primary Examiner*—Vinh P. Nguyen
*Attorney, Agent, or Firm*—Michael S. Yatsko; Ronald M. Goldman

[57] ABSTRACT

In a solar electric supply system in which an electrical load is supplied with current produced by a solar array formed of multiple solar panels, each solar panel is individually selected and tested to ensure proper performance by varying the duty cycle of an associated variable transconductance device connected between such solar panel and the electrical load. The method determines the respective solar panel's open circuit voltage, its full-load current and obtains various output voltage and current values responsive to different duty cycles, whereby the maximum power point for the solar panel may be determined.

3 Claims, 5 Drawing Sheets

Fig_1

Fig_2

Fig_5

Fig_6

Fig_7A

Fig_7B

Fig_8A  Fig_8B

Fig_8C 5,648,731

METHOD OF CHECKING SOLAR PANEL CHARACTERISTICS IN AN OPERATING SOLAR ELECTRICAL SYSTEM

This application is a division of Ser. No. 08/060,103, filed May 11, 1993, and now U.S. Pat. No. 5,530,335, granted Jun. 25, 1996.

BACKGROUND OF THE INVENTION

The principal source of electricity for spacecraft is the solar array, which converts sunlight into direct electrical current. In conjunction therewith rechargable batteries are used to provide the necessary electrical current during those periods when the satellite is on the dark side of its orbit around the earth and, consequently, the solar array is shielded from sunlight and unable to produce electrical current.

The electrical power generated by the solar array is distributed within the spacecraft over the power bus, an electrical wiring system, not only to the spacecraft's electronic apparatus, but to the rechargable battery as well, to replenish any expended electrical power. In the re-charge mode, the battery, thus, also effectively functions as part of the system's electrical load.

Different satellite missions demand different electrical power supply requirements. For example, a satellite operating in geosynchronous orbit is exposed to sunlight for approximately twenty two and one half hours and to darkness for one and one half hours in a continuing sequence. However, in a low earth orbit, at an altitude of less than five thousand miles, the satellite is exposed to sunlight for only sixteen minutes and then to darkness for sixteen minutes in continuing sequence. The power supply systems for the respective missions are consequently different and are not interchangeable.

Heretofore solar array power supply systems were custom designed for specifice missions with the attendent development and production costs. Hence, to control costs a need arises for power supply systems the are modular and can readily be used for different satellite missions.

An object of the present invention is to provide a power supply system having modularity; one useful in different missions with different power requirements that can be adapted with only routine and minor changes. Such routine changes and adaptations would involve, as example, selection of the number of solar panels that together form the solar array to meet the different requirements.

A further object of the invention is to provide a digitized modular power subsystem without adding unnecesary weight or expense to a given satellite.

SUMMARY

In accordance with the present invention, a system for supplying d.c. power to an electrical load, in which the load includes a rechargeable battery, is characterized by a plurality of uni-directional current conducting power sources connected in common to the electrical load with each of the power sources, including a solar panel and a controlled variable transconductance device, such as a Buck converter, connected in electrical series circuit. The current generated by the multiple power sources is thereby combined to supply the electrical load.

A digital processor, including a stored program, is coupled to the control inputs of the variable transconductance devices and selectively individually sets the duty cycle of each of such transconductance devices. The power supplied to the electrical load by such power sources is individually controlled by the digital processor.

The system is equipped with sensors, including current sensors that monitor the current input to and output from the battery. Responsive to the current sensors, the digital processor monitors the state of the charge of the battery by employing an ampere-second integration technique and ensures that the duty cycles of the respective Buck converters permit sufficient current to flow from the multiple solar panels recharging the battery as needed. In another mode the Buck converters are adjusted thereby to provide a trickle charge current to be applied to the battery, even when the battery is sensed to be fully charged.

In another specific feature of the invention, controlled by the stored computer program, the majority of the individual power sources are maintained in an essentially maximum current producing condition to generate most of the current required by the load, leaving a slight deficit in required current, and a reserve power source is adjusted in output to make up the deficit in required current. Accordingly, the total current from all power sources meets the specific current requirements of the system load. Through continued periodic automatic adjustment of the reserve power source the current is continuously adjusted to meet load current requirement as such varies with time, effectively "fine tuning" the total current output. A solar powered battery bus system for spacecraft application is presented in the patent to Bavaro U.S. Pat. No. 4,794,272, granted Dec. 27, 1988. In that prior art the solar array is operated at its maximum power point, requiring the combination of voltage and current to be at the maximum level. That patent literature also refers to the use of a digital processor system in connection with spacecraft power supply systems as a less effective means to maintain the solar array at that maximum power point.

In contrast to the prior art teaching the processor control in the present invention controls the individual solar panels which form the array through control of the individual associated Buck converters. Each panel in the array may be individually adjusted to produce appropriate power as desired; other panels may be added or deleted.

More specifically it was discovered that at essentially the maximum power point of a given solar panel and Buck converter combination, the ratio between the panels maximum power point and its open circuit voltage is essentially a fixed value, one that does not greatly change with time. That fixed value is determined and stored in the computer's memory. When the program directs that a power source produce maximum output current, the computer simply retrieves such stored ratio value and sets the duty cycle of the associated Buck converter accordingly. With the foregoing structure, the power circuit is thus set to produce full current without the necessity of calculating the circuit's maximum power point at that time. Unlike the prior art there is no need to operate the solar array precisely at its maximum power point and the importance of continuously determining that critical operating point for each solar panel is obviated.

A practical embodiment of the invention requires monitoring battery current that ranges in level from very large values in either of a positive and negative direction to smaller trickle current and thereby requires current measuring apparatus that covers a wide dynamic range. A subsidiary aspect to the present invention is to produce a new current monitoring apparatus of that required dynamic range. To that end a plurality of separate magnetic amplifier type measuring devices having different measurement ranges are serially connected to measure current and, with the aid of computer, determine the direction of current flow, either into or out of the battery. Accordingly a subsidiary object to the invention is to provide novel computer assisted DC current measuring apparatus capable of covering a wide dynamic range.

The foregoing and additional objects and advantages of the invention together with the structure characteristic thereof, which was only briefly summarized in the foregoing passages, becomes more apparent to those skilled in the art upon reading the detailed description of a preferred embodiment of this invention, which follows in this specification and appended claims, taken together with the illustration thereof presented in the accompanying drawings.

BRIEF DESCRIPTION OF THE DRAWINGS

In the Drawings:

FIG. 5 is a flow chart of the steps performed in the embodiment of FIG. 4;

FIG. 6 is a representative timing diagram for the computer;

DETAILED DESCRIPTION OF A PREFERRED EMBODIMENT

Figure 1:
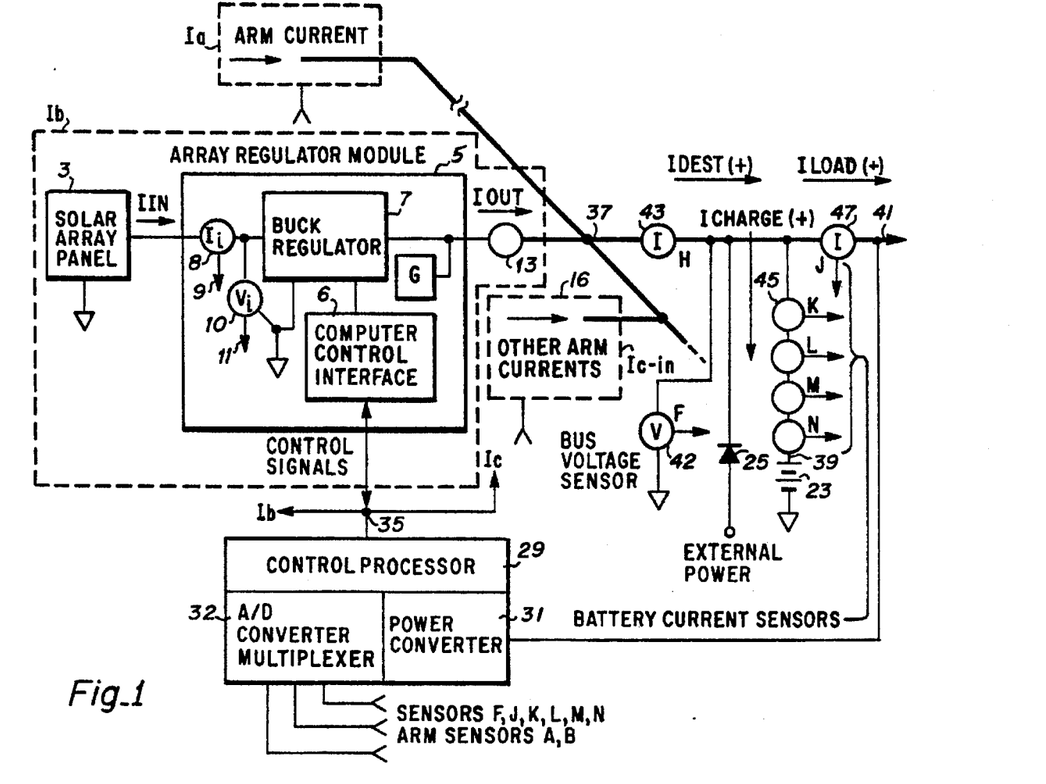
FIG. 1 presents a block diagram of an embodiment of the invention.

Reference is made to the preferred embodiment of the invention presented in FIG. 1 in block diagram form. A first DC power generating circuit 1a, bounded by dash lines, includes a solar array panel 3 or subpanel, as variously termed, which forms a constituent element of a solar array. The solar panel has its output connected to feed current generated into the input of an array regulator module 5, the latter of which incorporates a Buck converter type variable transconductance device 7.

Array Regulator Module 5 also includes a computer control interface 6 whose output is coupled to the control input of Buck Regulator 5. In turn the input of the interface is coupled to the output of control processor or computer 29, later herein discussed. An input current sensor 8 is connected in series to the regulator input to monitor the current supplied by the associated panel 3 and an input voltage sensor 10 is connected between the Buck converter's input and electrical ground. Each of those sensors includes an output 9 and 11 for coupling information to computer 29.

Through its output the power control circuit is connected to supply DC current over the main power bus 37 to the electrical load and/or rechargeable battery 23, which, suitably, is a rechargable battery of the Nickel Cadmium or Nickel Hydrogen type. A block G provides operating voltages to the electronic circuits of the Array Regulator Module, the latter sometimes being referred to herein as "ARM". An output current sensor 13 is shown serially connected between the output of the array regulator 5 and power bus 37 to provide information on the ARM's output current. Sensor 13 is preferably implemented in software, in lieu of hardware for reduced weight, and, hence, is a virtual sensor. When operating the ARM in a region of known efficiency, the output current, $I_{out}$, is given by the relation: Iout=Iin*Vin*n/Vout, where n is the expected or measured efficiency, and, hence, is easily calculated by the computer. For the purposes of this invention, "n" may be assumed to be unity, even including the residual current drawn by each ARM's housekeeping power supply "G".

Two additional power generating circuits 1b and 1c are also illustrated by blocks formed by dash lines, with their respective outputs being connected to power bus 37 and, thereby, to the electrical load and/or battery 23. Power generating circuits 1b and 1c are identical in structure to power generating circuit 1a, including like measurement sensors, and like connections are made with their respective array regulators and the control computer 29 as represented by the partial electrical leads therefrom. As represented by the dotted portion of the power lead it is understood that many additional such power circuits are included in the system, but not illustrated, with their outputs also connected in common to lead 37 to thereby provide multiple or parallel sources of DC current.

As is appreciated each of the solar array panels, such as 3 in power circuit 1a, are mechanically arranged as a panel of a solar array, which may be of conventional appearance in which the panels are arranged side by side to typically form a large rectangular area, not illustrated. The solar array so formed is of conventional structure, except that instead of the panels being wired together in parallel at the physical location of the array, the circuit output lead for each panel extends to and is separately coupled in circuit with the input of an associated one of the array regulator modules, such as module 5 for panel 3. That connection allows the solar panels to be individually controlled in accordance with the invention.

To the right in the figure another current sensor 43 is connected in series with electrical bus 37 and provides the measure of the total DC current flowing on the bus. As in the case of sensor 13, preferably sensor 43 is also a virtual sensor and is not physically present or wired into the circuit. The sensor represents the sum of the individual currents obtained from the output current measuring sensors, such as sensor 13, of the individual power generating circuits and is obtained by simple calculation.

Current sensor 45 is located in series circuit with battery lead 39, measures the battery current, and provides output at B with that information. Although sensor 45 may be a single device in practice as illustrated and later herein described in greater detail, the battery current sensor 45 is formed of a larger number of measuring devices, particularly four separate current measuring units, 45K, 45L, 45M and 45N, each of which is of conventional design that is commercially available. As indicated each of those sensors has output for coupling to the appropriate sensor input circuits of computer 29 via A/D and analog signal multiplexer 32.

Another current sensor 47, the load sensor, is placed in series with the load bus 41, the portion of the power bus 37 that extends to the right of its electrical connection with the battery circuit, and measures the current to the external power consuming electrical and electronic devices, not illustrated, that serve as loads in the system and provides output at C with that information. That sensor also has output which is coupled via A/D converter multiplexer 32 to the computer's inputs to thereby provide information on the "net" current being taken by such equipment, not illustrated, that is connected to load bus 41.

To provide the information on instantaneous current levels, current sensor 47 is preferably of the magnetic amplifier type well known in the industry and commercially available. Typical sensors of that type require a source of ac power at a 2.5 KHz frequency at relatively low power. Such ac power is obtained by conversion from the dc voltage on the power bus by means of a conventional oscillator that receives dc operating current from the bus and generates the requisite audio frequency signal, which conversion apparatus may be supplied integral with the measuring device.

A bus voltage sensor 42 is coupled between the bus and ground to measure bus voltage. The sensor in like manner provides its output to the computer via A/D converter and analog signal multiplexer 32.

A control digital processor or computer 29, as variously termed, provides the monitor and control tasks in the system. A power converter 31 associated with the computer is connected to electrical bus 37 for receiving the battery voltage and converting that to the requisite voltage levels required to operate computer 29, which is thereby supplied with requisite electrical power. And an analog to digital, A/D converter and multiplexer apparatus 32, also of conventional structure, has its inputs connected to the various sensors, on a time shared multiplexing basis to receive sensor information and in turn supply the information thus obtained to the computers inputs. The computer, pursuant to the installed program, receives that information and stores same in its memories and/or acts thereupon as commanded by the program.

Computer 29 is a programmed general purpose digital computer, containing a stored computer program, the software, whose operation is controlled by such installed program, the software, which contains the steps and algorithms hereafter further discussed, for sensing the condition of various sensors and for controling the array regulator modules to regulate current to the electrical load, the latter task including supplying charging current, as necessary, to battery 23. The computer may be dedicated to the power control functions or may represent a portion of the spacecrafts main computer that is programmed to also handle the power control functions in addition to the other duties within the spacecraft. While the system may be operated with any of the commercially available high speed computers manufactured by IBM Corporation, any of the more ruggedized computers, such as the 1750 A processor, is preferred for spacecraft applications.

The output of the computer 29 is connected over a control bus 35 to each of the Array Regulator Modules 1a, 1b, 1c and any others installed in the system. Such control bus is of known structure, such as a conventional serial type data channel or, less preferably, a parallel type data channel for communicating digital information from the computer individually to selected array regulator modules.

Computer 29 has access to the measurement information on the various current levels sensed by each of current sensors 43, 47, 45 and 51 and array regulator sensors 8 and 10. As illustrated, the respective outputs of those sensors are coupled by known data bus structure to the respective inputs of computer 29 so that the computer may receive and act upon the measurement information in accordance with the process steps being directed by the computer program. That data bus is preferably of the parallel type as shown, but the serial type may provide an acceptable alternative.

The DC power supplied by each solar array is controlled by an associated Array Regulator Module 5, which, in practice, incorporates the conventional "Buck converter", a known programmable transconductance device, as a principal element.

Figure 2:
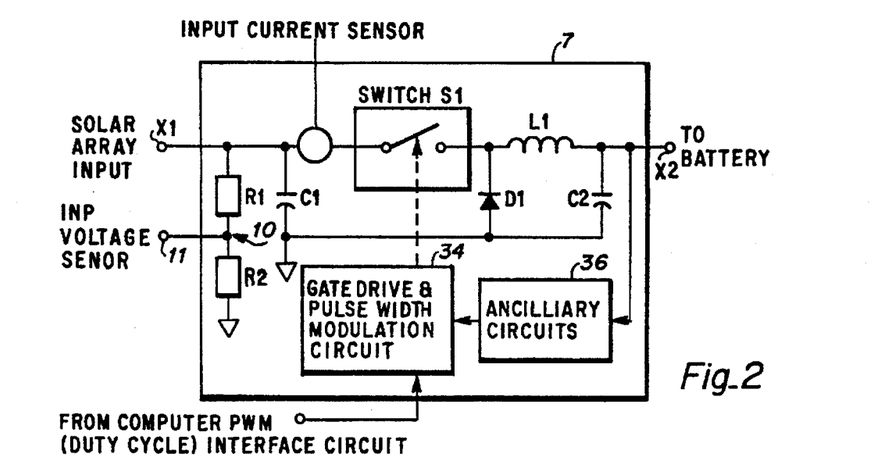
FIG. 2 schematically illustrates a Buck converter type variable transconductance device that is used in the embodiment of FIG. 1.

Reference is made to FIG. 2 which for completeness illustrates the Buck regulator or converter, familiar to those skilled in the art in partial schematic diagram form. The converter comprises input filter capacitance C1, Switch S1, Diode D1, output filter inductance L1 and output filter capacitance C2. Capacitance C1 is connected in shunt between the converters input X1 and ground. Input X1 is connected in series circuit with S1 and the circuit formed by inductance L1 and capacitance C2 with a flyback diode D1 connected accross in shunt of that L-C circuit. An output X2 is taken from the converter at a circuit position between L1 and C2. Switch S1 may be a single electronic switch such as a transistor or field effect transistor or other known electronic switching devices of greater complexity.

The Buck converter possesses a controllable duty cycle, wherein the quantity or percentage of current that it may pass through to its output is a function of its programmed duty cycle, and a control input for setting said duty cycle responsive to a control input voltage. These types of switched dc to dc converters are known and generally described in the literature, as example, in an article by Wester et. al appearing at pages 376 through 385 in the IEEE transactions on Aerospace and Electronic Systems Vol. AES-9, No. 3, May 1973 to which the interested reader may make reference as desired.

The Gate Drive and Pulse Width Modulation circuit illustrated by block 34 converts the duty cycle signal supplied by computer interface 6 in FIG. 1 into drive signals for Switch S1. The switching frequency of S1 is determined internally to this function or is determined by the computer interface circuit. The duty cycle requested by the computer, expressed in counts that may be in the range of zero to 203 counts in the practical embodiment, is converted to an ON pulse for switch S1 of a period equal to DUTY_CYCLE* (12.5/203) microseconds. Hence, a duty cycle of 203 counts provides 100% conduction; that is, the ratio of ON TIME to the sum of the ON TIME plus OFF TIME is equal to 1.0.

In practical application the switching frequency of switch S1 is on the order of 80 KHz and C1 and C2 are on the order of 10 microfarads in value and L1 on the order of 160 Micro Henries. Resistors R1 and R2 connected in series between the input and ground potential form a resistive voltage divider, the midpoint of which supplies a voltage representative of the input voltage. This serves as the input voltage sensor 10 in FIG. 1. and is illustrated in this figure also by choice.

Auxilliary circuit illustrated by block 36 has its input connected to output X2 and thereby receives the output voltage. In turn the output of the auxiliary circuit is fed to circuit 34 to provide operating voltage and current to the latter circuit. Auxiliary circuit 36 may thus also serve other power supply and housekeeping functions as needed by any specific implementation of the converter.

It will be noted that the analog type feedback mechanism of the classic Buck "regulator" is omitted, hence the regulator may be termed a converter. Instead of analog feedback, however, pulse width modulation, the ratio of "on" time to the switching period of such regulator is controlled through a parallel or serial digital interface by the system's computer. Feedback is provided. The feedback to the regulator is provided through digital processing by computer 29 in FIG. 1. And that digital processing monitors battery current, not bus voltage as would be the normal configuration for a Buck regulator in the classic sense. It would appear thus that the Buck circuit as used herein may thus be referred to herein either as a converter or, with the particular feedback provided in the invention, as a regulator. For the present invention it is understood that such Buck regulator is the variable transconductance device that has its transconductance controlled by a digital computer. And the overall function of the variable transconductance device in which the Buck converter is a principal element, referred to in FIG. 1 as an array regulator module is to function as a regulator.

The Buck converter's duty cycle may be varied thereby from between zero per cent, which effectively shuts it off, to 100 per cent, which essentially causes a full conduction condition although not normally a maximum power transfer condition, and may be set to an intermediate duty cycle that when taken together with the electrical characteristics of the associated solar panel results in maximum current and, hence, the "short circuit current" being supplied from the solar panel to the output of the converter. The computer thus may enter appropriate commands to the Buck regulator so as to set the duty cycle to the value specified by the stored computer program.

Figure 3A:
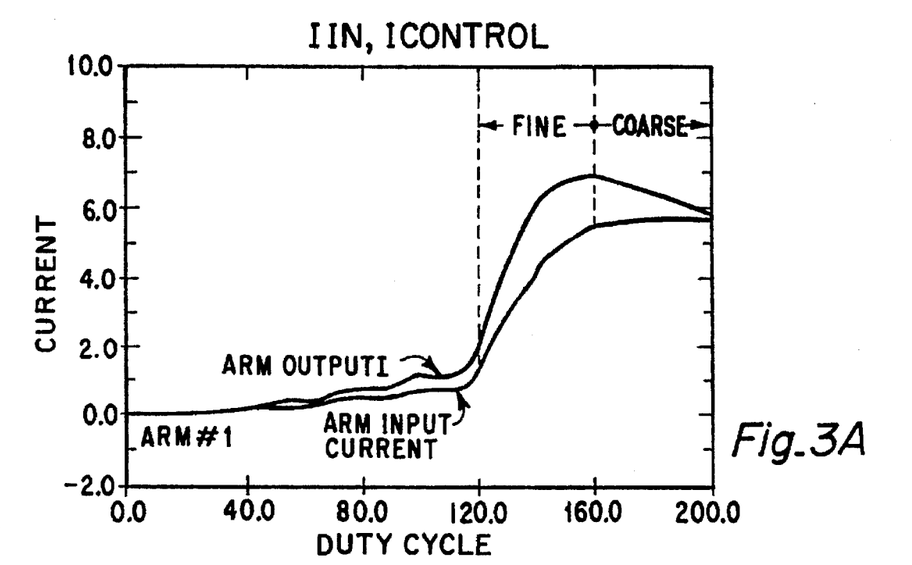
FIG. 3A illustrates the output current characteristic of a typical array regulator module as a function of the module's duty cycle based on the simulated solar array current vs voltage characteristic presented in FIG. 3B.

By changing the Buck converter's duty cycle, the dc power and, hence, current generated from the associated solar panel to a battery clamped electrical bus, the bus 37 to which rechargeable battery 23 in FIG. 1 is connected, also changes as a direct response. A transfer characteristic, the current conduction as taken against the per cent duty cycle for an array regulator module, is illustrated as example in the curve in FIG. 3 to which reference is made.

Figure 3B:
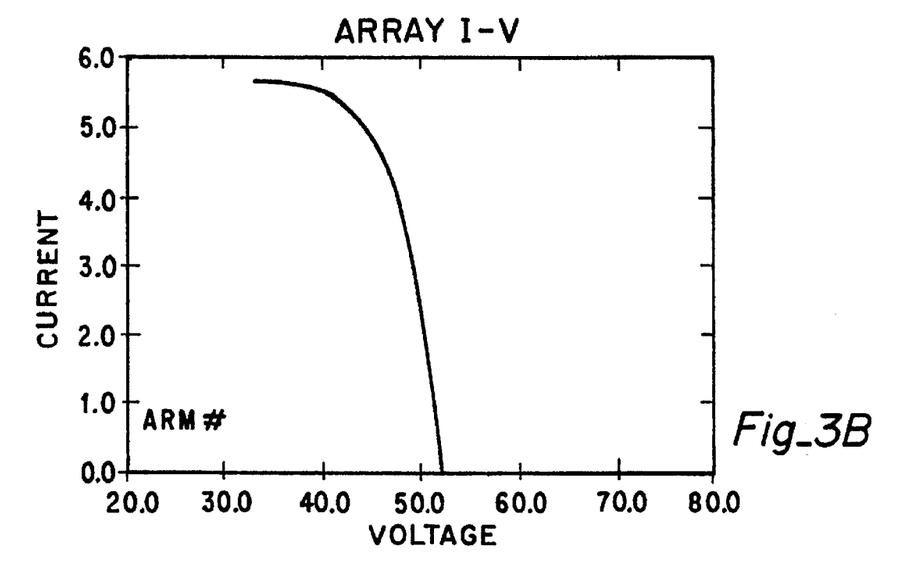

FIG. 3A illustrates the transconductance power transfer characteristic of the array regulator module that is based upon the simulated solar panel I-V curve presented in FIG. 3B to which reference is made. The characteristic curve of FIG. 3A is believed to be typical; one of a family of curves that are a function of both battery voltage and solar panel output, BOL to EOL. The characteristic is also non-linear, steeply rising to a peak and then gradually reducing in level. The peak of the power transfer curve divides the curve into two regions, the first to the left corresponds to the voltage limit portion of the array I-V curve and the second region to the right corresponds to the current limited portion of the solar array panel. The peak power transfer is equal to the solar array peak power output multiplied by the Array Regulator Module's electrical efficiency, which in practice ranges between 95% and 98% efficiency, typically less than one hundred per cent. In this example, the bus voltage, also the battery voltage, is approximately 31 volts and the ARM power point is approximately 40 volts.

As shown in FIG. 3A, with increasing duty cycle the array regulator modules provides greater electrical power output in the first region, providing a dynamic power range extending from zero, no power, steeply rising up to the peak power point. This first region between zero to 160 counts thus may be referred to hereafter as the "fine control" region for reasons which become apparent later in this description. In the second region between 160 to 203 counts, representing between an 79% to 100% duty cycle, conversely, the array regulator module's output power decreases with increasing duty cycle and has a dynamic range between peak power to the "clamped power level", the solar panels short circuit current, $I_{sc}$, multiplied by the bus voltage, $V_{bus}$. The second region may be referred to hereafter as the "coarse control" region. As illustrated, in the second region the buck converter is always found to be in a "continuous conduction mode". Whereas in the first region, the Buck converter may drop into a "discontinuous conduction mode", one in which the gain slope drops to a shallow value between no power and peak power, $D_{peak}$.

With the panel's output connected through the variable transconductance device, the array regulator module, to a d.c. electrical load, exposing the solar panel to solar energy, sunlight, d.c. current produced is generated and supplied to the associated array regulator module at the output voltage level existing at the panel's output terminals, and through the regulator module to the electrical bus and any electrical load connected thereto. Each respective solar panel thus effectively contributes DC power and serves as a DC generator. When blocked from exposure to the sun, the solar panels generation of electricity is interrupted.

Solar panels are typically composed of ten to twelve parallel strings of some one hundred and twenty solar cells of the Silicon or Gallium Arsenide types. Such strings are "diode ORed", that is, the strings are placed in parallel circuit using diodes, known uni-directional current conducting devices, such that a short circuit in any one of the strings cannot cause the other strings to short out. Thus the solar panel can only serve as a source of current, not "sink" current. Thus if one of a group of solar panels, that are connected in parallel to an electrical load as in the present invention, fails, the current supplied by the remaining solar panels cannot be diverted to the failed panel.

With each solar panel and array regulator module combination serving effectively as a separate electrical generator or power source, by selectively individually setting the duty cycle of the individual Buck converters of the array regulator module associated with the respective solar panel, the computer controls the current which flows from each of the solar panels to the electrical load.

The computer program may specify that certain of the solar panels be turned off, in which case the computer sets the array regulator modules associated with such panels to a zero per cent duty cycle. In other cases, the computer may set the duty cycle of some or all of the Buck converters so that the duty cycle falls within the coarse region of the transmission curve of FIG. 3A. In still other cases the computer may specify that some Buck Converters operate within the coarse region and at least one of those converters operate within the fine region of FIG. 3A. In the latter instance a particular adjustment may be made of one array regulator modules duty cycle with the fine region to make fine adjustments of total output current, while leaving the remaining modules at full output current, thereby optimally "fine tuning" the level of dc current applied to the electrical power bus. As example, with fourteen such power sources, one may be fine tuned in that way and the remaining thirteen be set to the same value in the coarse range that produces maximum output current.

In operation the state of charge of battery 23 is monitored by computer 29 based on information supplied by the appropriate current sensors 45. When the battery charge is less than full, the computer controls the charging source, specifically the Array Regulator Modules, to apply full charging current; when the battery is full charged, the computer specifies the charging current level as a trickle charge.

At the time battery 29 is installed in the system, the battery is fully charged, which thus constitutes the initial value of full charge as known to the computer. Battery current samples are periodically taken in accordance with the program by reading the battery current sensors 45 in FIG. 1. Suitably this sampling occurs during every minor cycle of the computer, a period that takes approximately 128 milliseconds in one practical embodiment. The battery current samples provide the amount of amp-seconds or coulombs of electrical energy added, in the event the battery is being charged or, subtracted in the event of battery discharge. These samples are added by the computer, that is integrated and are subtracted from the immediately preceding computation. The addition of amp-second products preferably also includes an efficiency factor built in to the algorithm, which is typically 90% in the case of charging and approximately 100% in the case of discharging. The result of the computation represents the relative state of charge of the battery at that instant and is the number used by the computer to represent the battery's state of charge. When the battery is determined to be fully charged, amp-second integration of charge current is halted, even though the battery continues to receive a trickle charge current as discussed hereinafter. Discharge currents that are produced are continuously subtracted.

Coulomb or ampere-second product integration thus determines what is required to charge the battery. When the computer determines that the battery is fully charged, the computer sets the duty cycle of the array regulator modules to the required level to produce not only the load current, but a trickle charge to the battery as well. In so doing the computer selects which of the array regulator modules should be set to the "coarse" region of its transfer characteristic to provide higher power outputs and which are set to the "fine" region of its characteristic to provide lesser power levels. As a secondary aspect when only slight changes of current are necessary, the computer simply adjusts the duty cycle of the regulator modules that were set to the fine range, whereby a slight change of duty cycle creates a slight change in the output power from the associated regulator module, thereby effectively "fine tuning" the power level.

For ground based test operations, external power may be applied to the power bus via input 21, which is then applied to the power bus through diode 25. The diode prevents current from flowing in the reverse direction to the external power source.

In the foregoing description computer 29 was illustrated and discussed as a part of the combination and is dedicated to the tasks associated solely with the described combination. Although the invention may use a computer processor dedicated solely to the described purpose, however, the computer may serve other purposes on board the spacecraft as well. Ideally, to avoid addition of unnecessary weight to the spacecraft, computer 29 is one of the main computers aboard the spacecraft that has extra capacity so that a portion of computer time is reserved for carrying out the described functions, either on a time shared basis or by other conventional sharing technique.

Thus in the operation of the satellites main computer, the computer branches to the programs herein described to perform the series of measurements and set the necessary adjustments to the array regulator modules. Upon completion of it measuring function the main computer returns to its other processing functions and runs other programs needed in the spacecraft, not relevant to the present invention, The computer recycles in the program to repeat the described tests and adjustments, ideally, as frequently as eight times per second. As a consequence, a practical embodiment of the invention that uses the spacecraft's main computer saves the added weight of an additional computer and for that reason is preferred. In other instances a dedicated computer is preferred.

The number of solar panels illustrated in FIG. 1 is intended as being representative of a plurality of panels in any number; and is symbolic of the actual number that one may choose to install. Generalizing, it may be stated that any practicable number of panels, such as N panels, may be employed in each solar array, which is suggestive of the modularity enjoyed in the system presented. The number of Array Regulator Modlules (ARM) used, moreover, corresponds in number to the number of panels in the array, with perhaps one or more additional ARMs as spares. With N panels, thus, there should be minimum of like number of N Array Regulator Module's. Generalizing further, in systems in which spare panels and/or array regulator modules might be included as a precaution the number of those elements in that instance may be M, where M is a whole number greater than N, is provided, and the group of N panels and array regulator modules which are placed into use may be selected by the computer from amongst the group of M units available. In practical application as example, it is anticipated that fifteen to twenty panels will be used in each solar array.

Variations in the systems power capability are easily made. Solar panels may be added or subtracted as modules in the described power supply system, together with the associated array regulator module and voltage and current sensor, to make higher power and lower power power supplies for other applications. Additional elements may be hooked into position by means of conventional cables and/or printed circuit board connectors. To complete the fabrication of a new power supply one need only make slight alterations in the program stored in the computer to account for a greater or lesser number, respectively, of those elements or the program may account for such changes automatically as by polling all sockets for the presence of a panel and regulator module. The system thus is modular. The essential elements of the systems design remain the same irrespective of the particular spacecraft in which the system is applied. Hence economies of scale production may be achieved.

Another feature of this invention enhances the efficiency of the power supply system by controlling the array regulator's duty cycle to the level that allows the solar panel to produce maximum power. A solar panel as is known produces an output voltage that remains relatively constant for a range of current and then commences to drop or fall off as the current is increased further as earlier illustrated in FIG. 3B. The maximum power point typically is located at the point at which the current begins to drop in level. Locating that position is relatively straight forward: The power produced by the array with a given duty cycle to the Buck converter is measured, the duty cycle is increased and the power again is measured and a determination is made as to whether the power increased or decreased. If the power decreased, then the maximum power point was passed. This algorithm or "dithering process" is repeated until the proper duty cycle is selected for maximum efficiency power.

The foregoing algorithm carries out elementary calculations; calculations that may be accomplished by the computer associated with the present system as a branch in the software program. As is appreciated, with large numbers of solar panels the foregoing technique could divert the computer, and thereby create complications in the system. Accordingly the foregoing technique is not preferred.

Instead a novel "ratio metric" approach is used. Simply put, a single value K_Ratio, which may be referred to as the Loftis operating point, is determined empirically by measurement from the following relationship and that value is stored in the computer's memory and treated essentially as a constant during the operation of the system: Vmp'=Voc× K_ratio, where Vmp' is the desired array operation point, essentially maximum power, based on a prior measurement of Vmp and Voc under similar conditions. The array regulator, being a buck mode DC-DC converter, passes maximum power when Duty=Vbus/Vmp' where Vbus is the battery voltage that clamps the power bus. Thus the ARM's Duty cycle is set to Vbus/(Voc×K_ratio) to set the solar panel and ARM combination to produce a virtual maximum power output.

The K_ratio is determined manually under stable output conditions, i.e. operating under normal sunlight, the open circuit voltage, Voc, is measured and then the power outputs of the panel are determined. Experience has shown that using K_ratio so determined for the panel, allows extraction of high levels of power over a reasonable period of use. It is anticipated that the K-ratio figure need be manually measured only on a seasonal basis to determine whether there is any need to adjust its value as the panel ages in use. Although the foregoing method does not necessarily result in the solar panel's operation at the maximum power point, it produces acceptable result, and, importantly avoids the necessity of diverting the computer to time consuming tasks of making panel measurements and calculations to precisely determine the panel's peak power point for the large numbers of panels in the solar array.

It is believed that the foregoing description presents the principal aspects of the invention in detail sufficient to enable those skilled in this art to understand and apply the invention in various practical implementations. Notwithstanding the further description of aspects of the invention and additional illustrations should assist the understanding of those less skilled as well as to better present additional aspects and improvement inventions helpful to the practical implementation of the invention.

Figure 4:
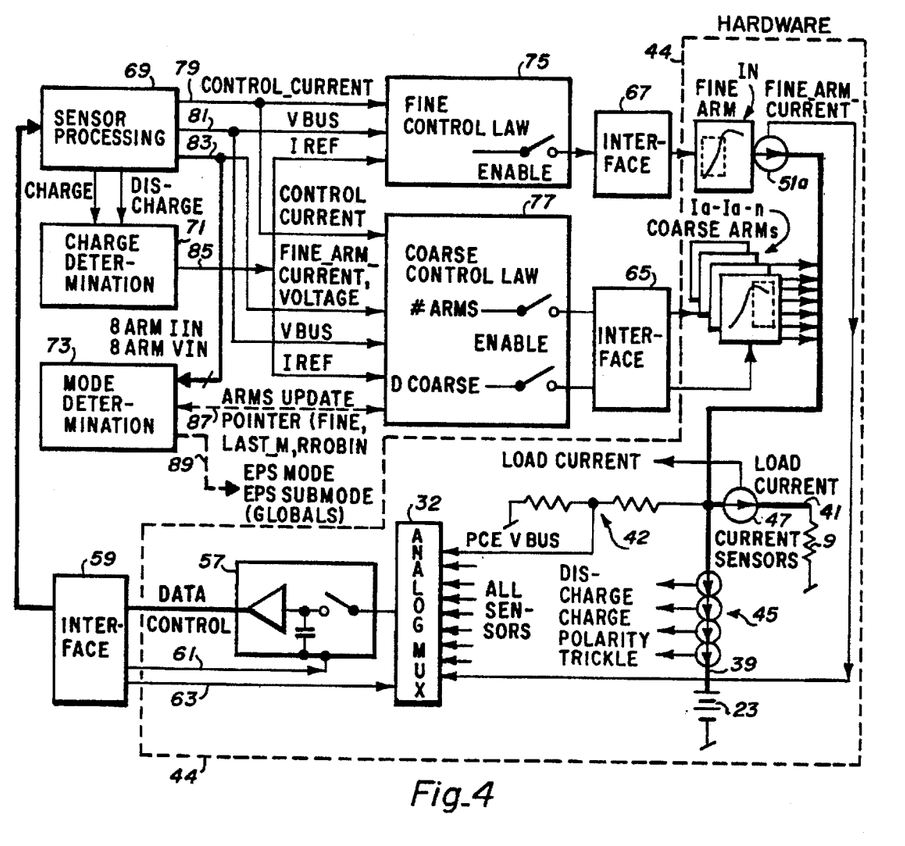
FIG. 4 is a functional block diagram of the software and hardware interface for the embodiment of FIG. 1.

The diagram of FIG. 4, to which reference is next made, illustrates a specific embodiment of the invention presented in FIG. 1, illustrating functions carried out by the computer under control of the stored computer program in block form or "software" modules as variously termed.

For convenience those elements that were described in connection with FIG. 1 are identified by the same number and are not necessarily again described. In this figure the elements framed by the dash line 44 represent the hardware, excepting computer 29. The elements located outside the frame, represent computer 29, the associated interface devices and the process functions performed by the computer in association with the software program.

The solar array and ARM combinations are represented to the right in the figure by rectangular charts, 1 and 1n, and are divided into two groups: The "coarse" group 1a through 1a–n, consititutuing the majority, and a single solar panel and ARM combination in, constituting a "fine" group. The outputs of those power circuits are connected via bus 43 to the main power bus 41 and to battery 23. The bus voltage sensor 42 in this figure is represented as an ordinary resistive type voltage divider. The electronic equipment being supplied with power is represented by load resistor 9.

The sensor outputs are connected to the input of the computer by an analog multiplexer 32, MUX, which provides for time sharing serial transmission of the various inputs. The output of MUX 32 is connected via sample and hold circuit 57 to computer interface 59, preferably a parallel interface. Control lead 61 extends from interface 59 to sample and hold circuit 57 or, optionally, a successive approximation A/D converter to provide enabling digital control signals at the appropriate time to enable transmission of the information from MUX 32 to the computer. Lead 63 provides digital signals to control the analog channel selection of 32. MUX 32 is capable of selecting signals from multiple sources via either single or double conductor shielded cable. The MUX and A/D converter are normally connected to the computer by a high speed parallel interface. Analog MUX and A/D converter control circuits communicate with the computer's central processing unit using the preferred parallel channels or a less preferred serial channels.

The control outputs from the computer for controlling the Array Regulator Modules extend from interface 65, a multiplexed high speed serial type interface, such as one megabit per second differential interface circuits, to the group of coarse ARM's and from interface 67, a single interface, to ARM 1N, the fine ARM. All other bold lines represent multi-variable signal flow lines indicating communication between software modules or between hardware interfaces and software modules.

The functional software modules include sensor processing 69, charge determination 71, mode determination 73, charge control represented by fine control 75 and coarse control 77, all of which functions were earlier generally described in connection with FIG. 1.

The relationship of the foregoing blocks is described by the interconnections or leads in the figure. Lead 79 from sensor processing block 79 is connected to each of the coarse and fine control blocks provides "control_current"; lead 81 provides the bus voltage, $V_{bus}$, to each of those same blocks; lead 83 branches to the mode determination block and to the coarse control law. Lead 85 from the charge determination block extends to inputs to both the coarse and fine control to provide the value of $I_{ref}$. The coarse control block 77 output via dash line provides input to the mode determination block. Lead 89 represents the output of the mode determination 73 as might be desired for coupling to processor supervisory and monitoring tools, telemetry subsystems, all of any suitable type.

An example of an operative embodiment would contain fourteen operating array regulator modules with thirteen of those operated in the coarse region, each supplying approximately 200 watts or 7 amps, and a single one operated in the fine region; and power bus voltages of between 24 to 38 volts.

The foregoing tasks represented by the software blocks in FIG. 4 are also illustrated in the flow chart of FIG. 5 to which reference may be made.

The process commences at A and the sensors are sampled and processed as represented at block B. The battery charge is computed as represented at block C. The charge control mode determines whether a full or trickle charge is necessary as represented at block D. As a result of such determination a branching occurs as represented at block F. It may be noted that the process allows for interruption for manual mode commands as represented to the arrow on the left of block D and when those manual commands are received, they take priority and the process process to implement the manual commands directly in the succeeding steps as represented by the vertical line MANUAL MODE.

Based on the charge control mode, determined by decision block F, the reference current ($I_{REF}$) for the Fine and Coarse control laws are developed. The trickle charge value, TC_VALUE, is the desired charge rate of the battery during trickle charge, typically C/100, the value of battery capacity in amp-hours divided by 100 hours, i.e. units of amps. This is determined at block E. The full charge value, FC_VALUE, is the desired charge rate of the battery during full charge, typically C/15, the value of battery capacity in amp-hours divided by 15 hours, i.e. units of amps. This means the battery will be fully recharged from 0% stored energy in 15 hours, assuming a charge efficiency of 100%. This is set at block G. The TC_VALUE and FC_VALUE are user defined and are determined apriori by the battery design and anticipated load cycles. For example the battery is 135 amp-hours and the TC valure is 1.35 A and the FC value is 9.0 A.

The reference current, $I_{REF}$, is the desired battery charge current. The control laws adjust the number of Array Regulator Modules that are "on line" and their respective duty cycles, as discussed hereafter in order to control the average battery current to the $I_{REF}$ value desired. Depending on the value of charge control mode, the proper value of $I_{REF}$ is selected. This is passed on to the Coarse Control Law at block H and the Fine control Law at block J. After the Array Regulator Modules duty cycles are determined by the Control Laws, the duty cycle calculations for one or more ARMs on a "round robin" basis are updated as represented at Refresh block K. That step insures that in the quiescent operation, all ARMs are refreshed at least every N minor cycles, where N is the number of ARMs coupled to the computer and power bus.

If during eclipse the desired battery charge current cannot be met,the control law attempts to turn all available ARMs to a high output current condition and extract the prescribed maximum power from each ARM. The ARM dedicated to the fine control loop will also be set to extract maximum permissable current.

During eclipse exit, in which the solar panels are returned to nominal sun conditions, the control law decrements the number of ARMs on line, as required, decreasing the total current output to meet, but not exceed, the desired battery charge current. During the normal seasons when eclipses are routine, the eclipse entry is normally entered with the control law operating at TRICKLE CHARGE mode. In practice eclipses of up to 72 minutes are expected during which period the battery alone supplies all required spacecraft power and the battery should not during that period of eclipse be depleted below the maximum design Depth of Discharge (DOD) limit, approximately 75% of the battery design amp-sec capacity, coulombs. When eclipse exit occurs, the CHARGE CONTROL MODE is likely to be found in FULL CHARGE requesting maximum battery charge current.

Due to the thermodynamic conditions on the solar array, the range of operating voltages varies by a factor of nearly 2 : 1 in open circuit voltage, from full sun to cold eclipse. The peak power available from the array panels must be handled by the Array Regulator Modules using the prescribed control scheme. With robust electronics and thermal design considerations, no changes to the control system algorithms are required for eclipse entry or exit conditions.

Control algorithms may be incorporated in the process to reduce stress on the ARM during foreseeable different dynamic conditions. With the multiple array voltage and current sensors available on each ARM in the present invention, eclipse detection capability with multiple sources is permissible. Safe modes for the ARMs during transient conditions are two: (1) 0 or OFF duty cycle condition, in which no current passes, and (2) 100% or ON duty cycle condition in which the Array short circuit current passes, when available.

As those skilled in the art will appreciate with proper eclipse detection added to those less desired embodiment, additional mode logic provisions can be made to establish one of the two ARM safe modes of operation to minimize electrical and thermal stresses until nominal conditions are achieved. In as much as such additonal methods are not required for the preferred embodiment and are not necessary to an understanding of the present invention they are not further discussed.

As illustrated in the timing chart of FIG. 6, the various tasks are carried out in sequence as a periodic function of the timing device, the computer's clock or an appropriate software timing loop dependent on the computer's clock. During each minor period, 128 milliseconds as example, the clock supplies a pulse represented in (a). Immediately after these clock pulses, a period is defined for acquisition of the sensor information, 10 milliseconds as example, represented in (b). That is followed by the system processing as represented in (c) and that in turn is followed by a period for the accomplishment of the commands and processing, represented in (d), which should be completed within a predetermined "latency" period prior to the commencement of the sensor information acquisition of the next succeeding clock cycle, eight milliseconds minimally as example.

Battery Charge Determination

The determination of Charge Mode, FULL or TRICKLE charge, is performed as represented by block D, which depends on the state of charge of battery 23. This tests the value of BATTERY_CHARGE in conjunction with the present CHARGE_CONTROL_MODE. If the charge control mode is "TRICKLE" and the value of BATTERY_CHARGE is less than 95% of the design value, then the "FULL" charge mode is selected, assuming the system is not in the MANUAL mode). Similarly, if the CONTROL MODE is in "FULL CHARGE" and the value of Battery_charge just exceeds 100% of the design value, then the "TRICKLE" mode is established.

The battery state of charge, SOC, is determined by amp-sec integration. This is a simple process determination: The subsequent charge=prior charge plus any change, represented in the following equation.

1-1: Battery_Charge (i + 1) =
Battery_charge (i) − _$I_{discharge}$ ×
ΔT _ + ($I_{charge}$ × ΔT)/Recharge_Ratio, where $I_{discharge}$ and $I_{charge}$ are measured in amps, and ΔT is the period between data points in seconds; Recharge_Ratio is a constant (approximately 1.1) to account for the charging efficiency; Battery-charge is in units of coulombs. It may be noted that in Sensor Processing, $I_{charge}$ is termed CHARGE current and $I_{discharge}$ is termed DISCHARGE current. $I_{charge}$ is defined so that it is either zero during discharge or less than zero when charging. $I_{discharge}$ is defined so that it is either zero when charging or less than zero when discharging.

By implementing an arithmetic test on the value of Battery_charge, ("FULL_CHARGE_TEST"), when Battery_charge exceed about 100% of its design value, TRICKLE_CHARGE mode is reinstated and equation 1-2 is used. The Battery_Charge(i+1) value is reset to the design limit value to prevent accrual of errors over many charge cycles. This is known as AMP_SEC_RESET. During the following Trickle Charge portion of the cycle, the following Battery_Charge equation is used:

1-2: $Battery\_Charge\ (i+1) = Battery\_charge\ (i) - Idischarge \times \Delta T$ By implementing an arithmetic test on the value of Battery_charge, ("TRICKLE CHARGE TEST") when Battery_charge falls to about 95%, a selected percentage that may be varied of its full value, Full_Charge mode is reinstated and equation 1—1 again applies.

Manual Mode

The flow chart of FIG. 5 also includes a section for a manual mode as part of the charge control task, as represented by block F. Manual mode allows manual control of the system's charge control tasks and in satellite application that manual control may be accomplished remotely from the ground control station. The manual mode allows direct control of the control loops by setting Iref to TC value of FC value. It does not intervene with amp-sec integration directly.

It may be appreciated that manual means may be used, not a part of the invention, to insure that the battery is charged over the many cycles in the mission life. The Recharge_ratio may be adjusted periodically manually to account for changes in the battery charge efficiency over long periods of many months. Those skilled in the art appreciate that additional backup charge determination and charge control systems may be created and incorporated within alternative embodiments of the invention.

With the foregoing description of the process steps in the overall operation of the present practical embodiment, one next considers the particular sensors and the processing of those sensors by the computer for this practical embodiment.

CONTROL LAW PROCESS

Data supplied by the control law defines the number of array regulator modules, ARM's, that needs to be turned on at full power level, 200 watts as example, and the appropriate duty cycle for same, the "coarse" loop, and the duty cycle of one ARM, the "fine" loop. Specifically, an ARM's duty cycle is updated, at a minimum, at least once, individually, within a minor cycle of the computer program. All such ARM's in the particular system have their duty cycle updated in round robin fashion, seriatim, in successive minor time cycles. Thus in a practical system with twelve ARM's, as example, all ARM duty cycles are refreshed, updated, in two seconds.

The control law process manages the power transfer through each array regulator module, prescribes the required power on the electrical bus to meet the varying demands of the battery and the other electrical loads supplied via the bus, and tightly regulates the battery current to the desired level, $I_{ref}$. In accomplishing that objective the control law process checks for and receives updated battery current information periodically, checks that information against standards in memory and, in the event of a departure, computes any necessary changes to the array regulator module's duty cycle so as to result in the latter's output of the appropriate power level to thereby protect the regulator modules against electrical overload. This is a closed loop sampled data system and is illustrated in the control logic diagrams of FIGS. 7A and 7B.

Figure 7A:
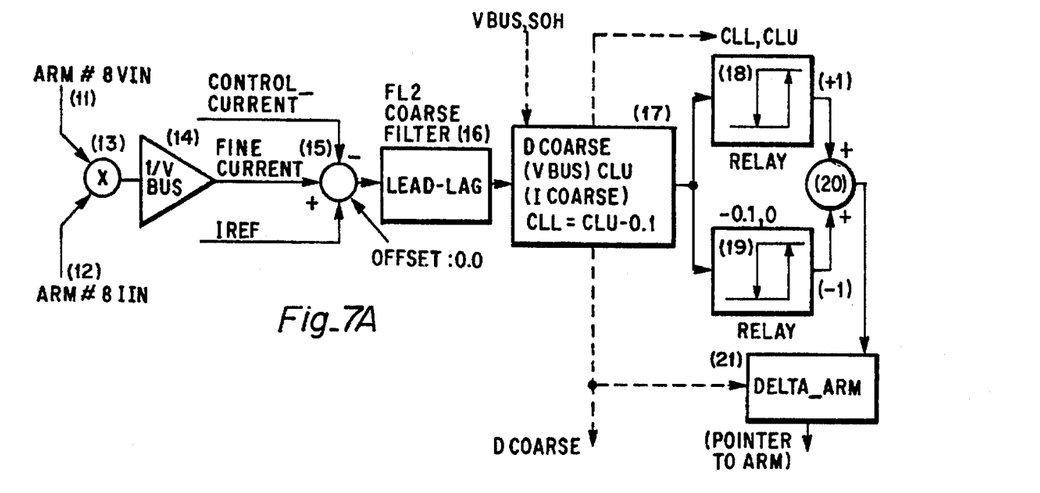
FIG. 7A is a control logic diagram characterizing the computation of control signals with array regulator modules intended to operate in a high or coarse current conducting state.
Figure 7B:
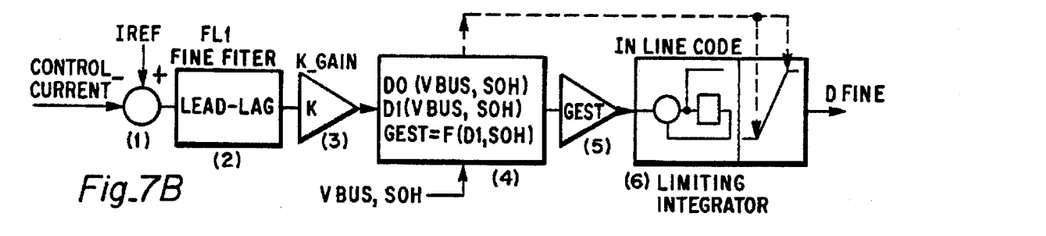
FIG. 7B is a control logic diagram characterizing the same computation for the array regulator module intended to be finely adjusted to provide the fine current conducting state.

As earlier discussed the plurality of Array Regulator Modules were arranged to operated in coarse and fine control regions. FIGS. 7A and 7B are logic diagrams that define a dual loop control law describing the software program to be carried out by the computer, comprising a coarse control loop and a fine control loop.

The symbols presented in these diagrams are briefly described to assist those less skilled. The CIRCLES - Indicate the SUM of signals (-CONTROL_CURRENT, +IREF yields IREF_CONTROL_CURRENT. The Box marked LEAD-LAG represents computation of the discrete data system response K (z–A)/(z–B), where K is the gain, A is the "zero" and B is the "pole" of the lead-lag element in the Z domain. In the time domain, the formula, expressed in Pascal language, is:

```
begin
    { r is the present INPUT }
    { c is the new OUTPUT }
    { rk is the previous INPUT }
    { ck is the previous OUTPUT }
    c:= K * (r – A*rk) + ck * B;
    ck := c; { Save "PREVIOUS OUTPUT" }
    rk := r; { Save "PREVIOUS INPUT" }
end;
```

The Triangles represent GAIN BLOCKS, essentially in Pascal language, Output=Input×K.

The FINE CONTROL, block [4]–in line code; reference may be made to the fine control law elsewhere herein described.

The LIMITING INTEGRATOR is described by the Pascal code:

```
Output = Input + Output
if (Output > Upper_limit) then
    Output = Upper limit
if (Output < Lower_limit) then
    Output = Lower_limit
```

COARSE CONTROL LAW [17] In-line code–Computed $D_{coarse}$ from variables $V_{bus}$ and state of health data, retained in memory, elsewhere herein described.

Relay or switch [18] provides the following logic:
Output is (+1) if input is>input_upper_bound (~5.5 amps) Output is 0 if if input is<input_lower_bound (~5.4 amps) The upper and lower bounds are computed by "in-line" code, and are equal to the desired power output (~200 watts) divided by the present bus voltage (~28 volts). The lower bound is the upper bound less hysteresis, which typically is about 0.1 amps.

Relay or switch [19] provides the following logic:
Output is (0) if input is>input_upper_bound (~0 amps) Output is (–1) if input is<input_lower_bound (–0.1 amps);

BLOCK [20] is a sunumation, essentially output=input_A+input_B. BLOCK [21]–Delta ARM. This prescribes whether a panel ARM combination needs to be added or subtracted from the array to meet the need for current and issues the appropriate command. The coarse control law provides a rough adjustment of battery current by enabling or disabling those array regulator modules at a "coarse" duty cycle. In contrast to the coarse loop, the fine loop provides a vernier adjustment of battery current between the coarse loop steps.

COARSE. The coarse loop provides coarse adjustments to battery charging current. This loop adds or subtracts array regulator module outputs to the electrical bus, with the duty cycle of those array regulator modules being programmed to operate in the coarse control region of the power transfer curve, earlier illustrated in FIG. 3A. It is noted that the array regulator module's efficiency is highest in this coarse region.

Power level is changed by this loop in steps by the addition or subtraction of an Array Regulator Module. In a practical embodiment, as example, each ARM supplies 200 watts and the coarse loop is said to have a dynamic range of from 1 to one less than the number of Array module regulators or solar panels, 1 to M, multiplied by the power output of each array. As example with 24 Array regulator modules of 200 watts each the power output is 4600 watts. The remaining ARM is used for the fine control loop as hereafter discussed in greater detail.

Assume that the power system in operation contains a number, N, of Array Regulator Modules in place. Of that number, numbers 1 through K are "on", that is operating at 100% duty cycle, and that ARM numbers K+1 through N are off, zero per cent duty cycle.

Sampled battery current is compared to the desired current to possibly produce an error current [15] ($I_{cc}$ to $I_{ref}$ producing $I_{err}$). $I_{err}$ is generated to and is filtered by digital low pass filter [16], the latter of which establishes the dynamic properties of the closed loop response. Limit currents are computed. These limits are based on the bus voltage and apriori the power output of the solar array, [17] including all solar subpanels. The filtered error current signal is compared to a limit current [19] and, if the difference, an error, is less than zero, then a "−1" is passed to the accumulator [21] via summer [20]. With the value (of −1) from step 4 above, the accumulator [21] produces the value "M" at its output, a number representing the number of solar array subpanels or, more precisely, the array regulator modules that are needed to produce the required wattage. In the practical case considered each ARM produces 200 watts, hence the value specified at this stage is M×200 watts.

The accumulator's output is processed by a software queuing task. Items to be processed are stored by the computer in a queue or list. That list of items is processed on a first in—first out order, FIFO. Depending on operating system software, all of the items in the list may or may not get processed in a particular time frame, except however, the ARM duty cycles, which are always processed during the period illustrated in FIG. 6, defined as DUTY CYCLE DIRECTIVES. The ARM duty cycles computed are then temporarily stored in a queue until the computer's processer addresses the DUTY CYCLE DIRECTIVE tasks, at which time the processor disburses the appropriate commands to the assigned ARM. The queue is then emptied awaiting the next processing cycle.

A $D_{coarse}$ "estimator" sends a Coarse Duty Cycle specification to array regulator modules 1 through M and those modules are programmed thereby to provide specified output. Any remaining array regulator modules in the system, say regulator module numbers M+1 through N−1 remain off, that is, remain at a zero per cent duty cycle, except for module number N, which, as elsewhere explained, was reserved for the Fine loop. This Dcoarse estimator is the value obtained using the "ratio metric" and K_described earlier in connection with the description of FIG. 1.

As earlier described in connection with FIG. 1 and FIG. 4, those Array Regulator Modules used in the "Coarse" duty cycle are programmed to be off, that is a zero per cent duty cycle, or to be on, at a level of $D_{coarse}$, a computed figure, which in practice could achieve levels of 100% and less.

Dcoarse is the precomputed duty cycle that effectively maps the electrical load, the battery voltage, onto the current limited portion of the solar array's I-V curve, the second region as described in connection with the transfer characteristic illustrated in FIG. 3 and later herein also described in connection with "state of health" tests. The foregoing steps are repeated in each minor cycle of the program.

In the next cycle if the number, M, obtained in step 5 is either greater or less than the number determined in the preceding cycle, then the appropriate number of Array Regulator Modules and associated solar panels will be added or subtracted from the array. However the actual number of ARM's that may be added or subtracted in the next succeeding cycle is LIMITED to a single ARM. Thereafter in every processor minor cycle, only one ARM may be added or subtracted from the initial network or group of the M ARMS.

Over the course of a number of minor cycles, ultimately, the number of ARM's introduced will equal the required number. As example, if three additional ARM's are required, they are added, one at a time during a minor cycle over the next three minor cycles. The foregoing step by step limitation avoids dramatic changes and instability that could create undesireable transients in the system.

When the Fine Loop is added in the foregoing operations, the switching strategy for the changes in the number of ARM's, the ΔM, could be perturbed by a continuous error on the battery current, injected by the fine loop. To preclude that from happening the estimated fine tune ARM output current is injected to the coarse loop error signal as shown at [15]. The fine ARM output current is computed from input power and bus voltage (at [11], [12], [13], and [14])

FINE LOOP. Reference is made to FIG. 7B, the logic diagram illustrating the Fine Loop, which functions as follows.

The sampled battery current, Control_Current, is compared to the desired current, $I_{cc}$ vs $I_{ref}$, and the difference, if any, produces at [1] an error current, $I_{err}$. The error current is filtered by digital low pass filter [2], the latter of which establishes the "band width" of the look, the bandwidth. A fixed loop gain factor [3] is applied to $I_{err}$. This optimizes the dynamic response. A dynamic gain correction factor, $G_{est}$, [5] is computed by processor [4]. The information on "Δ d" is integrated into absolute duty cycle (DFINE) by accumulator [6], symbolically illustrated in FIG. 13b, and produces the value $D_{fine}$.

Step 6 constitutes an integral controller. As a consequence there is no need to know where to start the duty cycle for a given output current. The error current, $I_{err}$, is examined and the ARM duty cycle is adjusted up or down as required in a converging feedback loop. The final value of the duty cycle, Dfine, determined during every minor cycle is passed to the particular Array Regulator Module that was designated as the Fine Adjust ARM.

The purpose of the dynamic gain correction factor in the preceeding step 4 is to convert current error into duty cycle error for the fine ARM; adjust the fine loop gain for stability.

Overload Protection. The power available from the solar array could in theory exceed the instantaneous power demand made on the electrical bus by the attached electrical loads, the latter of which includes the battery, that, during the solar array's exposure to sunlight, is either being recharged or trickle charged by the supplied current. Such an occurance would be more likely when the solar array panels are new, before the aging process reduces their conversion capability and efficiency. To avoid the gradual damage to the battery as would occur through overcharging, the power supplied by the array to the power bus, thus, must be restricted in level, which the present invention accomplishes.

Additionally, the quantity of electrical power that a solar panel in the array could theoretically deliver could in theory exceed the power handling capability of the associated array regulator module. All electrical regulators as a practical effect have some maximum power handling capability specified by the supplier, resulting from the capability of the components chosen by the manufacturer. For a Buck converter considered in a practical embodiment of the regulator, the maximum power handling capability is 225 watts, as example. That maximum power also serves as a limitation that should be observed in practice and is accomplished with the present invention through appropriate programming limiting the solar panel's output current. As is appreciated the described control law process recognizes and satisfies both requirements.

State of Health. Those array regulator modules that are added or subtracted in the coarse control loop to achieve changes in battery current, lesser or greater, in steps to attain the desired output current level in total are computed to each provide a prescribed or specified maximum power, approximately 200 watts each as example, discussed in connection with FIG. 1.

The duty cycle at that maximum power point is referred to as Dpeak, is equal to Vbus/(K_Voc×K_Ratio), where Voc and K_Ratio are predetermined constants stored in memory obtained from testing of the solar panels at least when the unit is first placed into service.

The operating duty cycle, Dcoarse, is one which provides the specified maximum power output with the panel in normal sun, less than that peak value, which is selected at the designer's discretion. Dcoarse, hence, should be some high fraction of Dpeak, suitably equal to Dpeak multiplied by the ratio of the maximum power output for the panel measured with the panel exposed to normal sun, K_Pmax, to the selected high power, K-Pref. The relationship is Dpeak<Dcoarse<1.0.

Dcoarse is an estimator for duty cycle that produces an array regulator module output power that is greater or equal to K_Pref, when the panel is capable of delivering even greater power. When power generated from the panel is less than K_Pmax, Dcoarse is set to Dpeak and the peak power point is selected. In order to obtain maximum power available for the solar panel the duty cycle, Dcoarse, of the associated array regulator module is set to the Dpeak value described.

As above indicated the values of Voc, Ratio, and K_Pmax are stored in the computer's database and give clue to the effectiveness of the associated solar panel and array regulator module combination or, as variously termed, such combinations "state of health". Seasonal variations in the foregoing values, which can occur in practice, can be compensated for by updating the solar array's power characteristics by running a state of health test on each solar panel and array regulator combination in the system.

To accomplish such a test, a sequential application of duty cycle values are prescribed, twenty such values as example given in sequence for the array regulator module associated with the solar panel being tested. One of the values is a Duty Cycle equal to zero for obtaining "Voc" and another is for a Duty Cycle equal to 1 for "Isc". At each step the panel's "Iin" (input current) sensor and "Vin" voltage input sensor is read and the result stored by the computer in memory and a table is constructed with Duty Cycles, Vin and Iin. Referring briefly to FIG. 1, computer control processor 29 contains the table of twenty test duty cycle values in its memory. In the case of a test of solar panel 3, the computer disconnects the regular control inputs applied to output 35 and at the appropriate time in the program applies the first test duty cycle to interface 6 to thereby set Buck regulator 7. The computer reads input voltage sensor 10 and then input current sensor 8, and then stores the values measured. That process is repeated until all of the test duty cycles have been run on the panel 3 and array regulator module 5 combination. The program may specify that the computer step in sequence to run the same tests and accumulate the same kind of data on the next power source combination 1b in FIG. 1 and so on for the remaining solar power sources.

From such data the aforedescribed parameters, Vmp and Imp, are derived from a linear search. This may be accomplished with the assistance of software programs commercially available that automatically derive a curve to fit a set of plotted or tabulated points. Other key properties of the array regulator modules gain and power output can be obtained from such a curve.

The foregoing is accomplished by the computer which carries out the specified steps or, in alternative systems, a stored control sequencer is employed. In still another alternative the foregoing tests may be made manually under ground control through suitable telemetry links and the properties thus determined placed in the computers memory for appropriate use.

Assuming that the solar panel is in reasonable condition, roughly twenty data points may be used to determine the shape and properties of the panels I-V curve, the type of curve earlier illustrated in FIG. 3B. As one appreciates from that curve one may easily determine Voc, the open circuit voltage; Isc, the short circuit current when clamped to a bus voltage Vbus; Vmp, the maximum power point voltage, and Ratio, the ratio Vmp to Voc. Vmp is the point on the curve where the differential maximum array power is extracted and the ratio is a simple calculation.

Typically the test time should be the duration of a minor cycle of the program. The testing of the multiple number of such power sources in sequence requires a like multiple of the testing time for a single one. As is appreciated the foregoing testing procedure offers added advantage to the described system.

As one array regulator module at a time is taken "off-line" from the main control loop during this state of health step and thus is not used for charge control functions for the interval required to take the measurement, its output current nontheless continues to be applied to the power bus and, hence, to the load and rechargable battery 23. Consequently some slight modulation of battery current is expected to occur during the test.

Figure 8A:
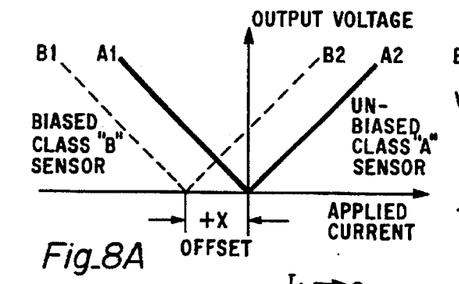
FIGS. 8A and 8B illustrates battery current sensor aliasing in a unique battery current sensor used in the system, schematically illustrated in FIG. 8C.
Figure 8B:
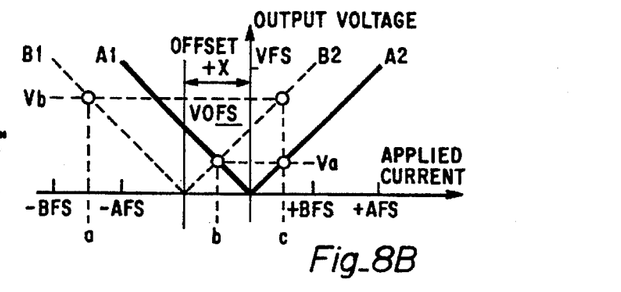
Figure 8C:
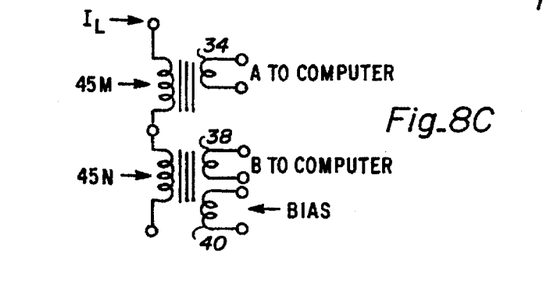

The novel structure of a battery current sensor employed in the preferred embodiment is next considered. As previously discussed the battery charge control laws requires information on battery current, both magnitude and direction; bus voltage and fine array regulator module output current. All required sensors are scanned by the analog multiplexer and "read" by the A/D converter during each minor cycle to acquire the information. The readings, expressed in counts, are then stored in association with each sensor element. The gain factors are applied to the ARM sensors to convert the readings from such counts into "VOLTS" or "AMPS", as appropriate. This is true for the load current and bus voltage sensors also. Were battery sensor 45 a single unit capable of measuring current polarity over a wide dynamic range, the computer would simply read that sensor as well. However, as was earlier noted, the preferred form of computer readable current sensor employs four separate measuring devices 45K, 45L, 45M and 45N. While two of those sensors may be read directly, the remaining two, 45M and 45N, serve as a single unit, which hence requires some further processing by the computer, is of a novel and unique design and a subsidiary invention. Reference should now be made to FIGS. 8A, 8B and 8C, which may be considered together.

The problems associated with the battery sensors is that of "aliasing"—A single voltage reading of the sensor can mean current "A" or "B", depending on the equation chosen. For a simple sensor this means the difference in reading between +X and −X amps and for biased sensors this could mean a difference between +W and −Z.

The technology preferred for acquiring the battery current information is that of magnetically coupled current sensors, also known as magnetic amplifiers. Since the power loss of a resistive shunt is prohibitive and the accuracy and survivability of a Hall effect sensor is incompatible with some user's satellite requirements, the mag-amp type sensor is used. The side defect of a magnetic amplifier sensor is its ability to provide the direction of current flow. This can be accomplished with a bias winding that provides the Current to Voltage characteristic of FIG. 8A.

Referring to FIG. 8B, the normal sensor voltage output represented by lines A1 and A2 are of slope "a" and offset "X" are design parameters which are specified for the design. Without bias, the mirror point of 0 voltage output point occurs at 0 amps (X=0). With a bias winding added, an offset at current −X is seen. If the operating range is restricted to a range ABS [−X to +BFS], then the sensor may be used to determine sign and magnitude by a simple conversion of the output voltage to applied current:

1—1: Current (+)=(Vrdg−Voff)×G, where

Vrdg is the DC voltage read at the sensor output,

Voff is the offset voltage (sensor reading at 0 amps input), Voff=X/G,

X is the sensor offset current,

G is the sensor gain slope in amps per volt (AFS/VFS)

Then, within a limited design range, the biased sensor may be used to provide a conversion of current to voltage which may then be processed by the computer into an indicated current.

Of course, if a large negative signal was applied, pushing the true current to an arithmetic value less than −X, a positive signal would be developed. Application of equation 1—1 would result in an incorrect conversion to current. The proper conversion in that instance should be;

1-2: Current(−)=−(Vrdg+Voff)×G, where Vrdg is a positive number.

With a single sensor, there is no way to know that this "alias" Current is the correct conversion. With two current sensors current detection covers a wider dynamic range.

Two techniques are used to detect the alias problem. Such technique involves the use of sensors taken in pairs. The first method applies the notion of two sensors of roughly equal design, one being offset with a bias, X as shown (B), and the other (A) without a bias, as shown in FIG. 8A. Both sensors are placed in series circuit in the electrical lead through which current is being measured, in this case the rechargeable battery 23 in FIG. 4, and thereby receive the same current stimulus. Preferably, both are read in quick succession by the same A/D converter so as to minimize errors due to slewing signals.

This arrangement is schematically illustrated in FIG. 8C in which magnetic amplifier's 45M and 45N have their principal current measuring windings or primary connected in series with the load current, $I_L$ and their measurement or output windings, 34 and 38, which are electromagnetically coupled to the respective associated primarys by the magnetic iron core represented by the three vertical lines, being coupled, directly or indirectly, to computer 29 for readout. Magnetic amplifier 32 includes the bias winding 40. By feeding a dc current from a bias source, winding 40 applies a magnetic field to the magnetic core, effectively biasing the core. Magnetic amplifiers of this type are commercially available, as example, from the Bell Company located in the U.S.A. The foregoing structure is entirely conventional and the magnetic engineering is believed to be well understood by those skilled in the art.

Referring now to FIG. 8B, one sees that a current level "c" produces a voltage Va on sensor "A" and a voltage Vb on sensor "B". Two possible aliases exist. The same Voltage could be considered on sensor "A" to have been developed by current "b", which is a negative value. The alias current "a" could be occurring on sensor "B", line segment B1, as determined by voltage "Vb". By computing the four possible currents from the two voltages measured and "correlating" the results, one infers that current "c" is most likely the solution. Since "a" and "b", computed from eqn. 1-2 for sensors B and A respectively, are not equal, whereas values "c" and c' computed by equation 1—1 are equal. If ideal situations are assumed, the exact solution of equations imputes the result "c" as being the correct current.

In reality, there are sources of error that could occur: slewing distortion caused by time- varying signals measured non-concurrently on sensors A and B; Nonlinearities in sensor transfer functions; and errors in the design vs actual gain slopes and offsets. Hence, in practice, it is best to compute the allowable sources of error and arrive at "error bands" about which the results are expected. Then the differences between computed currents (a−b) or (c−c') is compared within known limits. If (c−c') is within the known error band and (a−b) exceeds the error band, the current is assumed to be somewhere between location c and c'. Since the biased sensor "B" is prone to bias drifts whereas "A" is not, sensor "A" is normally selected as the most accurate indicator.

When the current level approaches zero or the crossover point of sensor B, the error of the calculations (a−b) or (c−c') will fall within the allowable error band. In order to determine the most likely accurate value, the answer providing the minimum error in this correlation is used. (i.e., if ABS[a−b]<ABS[c−c'] then the current b is chosen, not c'.

In the case of the battery charge or discharge current where no other in line sensor is operating within the design range (i.e. is saturated), another method is used to determine battery current direction and magnitude.

The virtual sum of ARM currents, sensor 43 described earlier in FIG. 1, assumes that current can flow only in the right (+) direction towards the battery. The load current sensor, being of type "A", no bias, also assumes that the current is always flowing to the right (towards the load). During discharge, the sum of ARM currents may be zero. Near eclipse entry and exit such sum may be less than maximum. By Kirchoff's Current Law, the estimated battery current Dest is then:

1-3: Dest=(SUM of ARMs)−Load with the+sign indicating battery charge current direction.

Due to the potential sources of error in the sum of ARMs virtual current sensor, a more precise method of magnitude determination is desired. By correlating the outputs of the class "A" sensor, one that is an unbiased configuration as shown in curves A in FIG. 7A and not the class B sensors defined to be offset as in Curve B, of wide dynamic range placed at "K", also known as the Discharge sensor, with the equation 1-3 above, the true battery large signal current can be determined.

Within the error band of the accumulated errors of the [SUM of ARM Currents] (H) and the Load sensor (J), this method is quite valid. When currents falling below the magnitude of the combined error band require measurement, then higher sensitivity sensors should be substituted as described by the first described method.

As an additional feature to the invention, the data obtained may be down linked to a ground station. That is, conventional telemetry equipment normally located on board a satellite may be fed the data in any conventional manner. The data may be echoed to the telemetry equipment.

Should one desire to render the foregoing system more failsafe in alternative embodiments one may add backup sensors and other portions of the apparatus as either spares to be called into operation in the event that a failure is detected or have them run simultaneously and with additional software modules have the computer correlate the results obtained from to determine which result obtained is the most reliable or if essentially equal result is obtained. Given the foregoing description, those skilled in the art are believed to recognize the routine mechanics to such an alternative embodiment. So doing also increases the expense of the system significantly and may also add considerably to weight, which has negative implication. Hence such an alternative embodiment is less preferred than that presented.

The foregoing algorithms and processes presented are sufficient to allow a skilled programmer to implement same in the appropriate computer language desired, whether Pascal, Ada, Fortran or otherwise, and vary the details of that programming to suit the needs of the computer system being selected.

It is believed that the foregoing description of the preferred embodiment of the invention is sufficient in detail to enable one skilled in the art to make and use the invention. However, it is expressly understood that the details of the elements which are presented for the foregoing enabling purpose are not intended to limit the scope of the invention, in as much as equivalents to those elements and other modifications thereof, all of which come within the scope of the invention, become apparent to those skilled in the art upon reading this specification. Thus the invention is to be broadly construed within the full scope of the appended claims.

What is claimed is:

1. The method of determining the voltage and current characteristics of a solar panel and variable transconductance device combinations from amongst a plurality of such combinations in and during operation of a solar powered power supply system that produces and supplies electrical power to a load via a bus, said load including a rechargable battery and said bus being clamped to a bus voltage, Vbus, each of such solar panel and variable transconductance device combinations being connected to deliver electrical power to said load, comprising the steps of:

selecting one solar panel and variable transconductance device combination for test from amongst said plurality of such solar panel and variable transconductance device combinations;

prescribing in sequence each of a plurality of duty cycles from a plurality of test duty cycle values and adjusting said variable transconductance device to each selected duty cycle in said sequence, and at least one of said plurality of duty cycles being equal to zero per cent and at least one other of said plurality of duty cycles being equal to one-hundred per cent;

measuring electrical current generated by and the electrical voltage at the output of said solar panel in said solar panel and variable transconductance device under test at each said plurality of duty cycles to produce a series of values of voltage and current in respect of each respective duty cycle; and determining from said series of values each of the solar panel's open circuit voltage, Voc; the solar panels short circuit current, Isc, when clamped to a bus voltage, Vbus; the maximum power point voltage, Vmp; the maximum power point current, Imp; and the ratio of Vmp to Voc, Ratio.

2. The method as defined in claim 1 further comprising the additional step of storing said determined values.

3. The method as defined in claim 1 further comprising the additional steps of defining a curve which fits essentially to the values of voltage produced as plotted against current produced.

* * * * *